(12) United States Patent
Adam

(10) Patent No.: US 6,395,384 B1
(45) Date of Patent: May 28, 2002

(54) LIGHTWEIGHT SUPPORT BASE FOR AN EQUIPMENT

(75) Inventor: Courtney Adam, Elk Point, SD (US)

(73) Assignee: Bramec Corporation, North Sioux City, SD (US)

( * ) Notice: Subject to any disclaimer, the term of this patent is extended or adjusted under 35 U.S.C. 154(b) by 1 days.

(21) Appl. No.: 09/649,036

(22) Filed: Aug. 29, 2000

(51) Int. Cl.⁷ .............................. B32B 9/00; B32B 27/00
(52) U.S. Cl. ................ 428/319.3; 248/678; 248/346.01
(58) Field of Search ................. 428/319.3; 248/678, 248/346.01

(56) References Cited

U.S. PATENT DOCUMENTS

| | | | |
|---|---|---|---|
| 3,713,620 A | 1/1973 | Tkach | 248/19 |
| 4,044,520 A * | 8/1977 | Barrows | 428/192 |
| 4,363,145 A | 12/1982 | Kawesch | 4/583 |
| 4,397,246 A | 8/1983 | Ishida et al. | 108/55.3 |
| 4,505,449 A | 3/1985 | Turner et al. | 248/669 |
| 5,209,968 A | 5/1993 | Sweeney | 428/312.4 |
| 5,268,226 A | 12/1993 | Sweeney | 428/312.4 |
| 5,664,394 A | 9/1997 | Sweeney | 52/782.1 |
| 5,713,165 A | 2/1998 | Erwin | 52/181 |
| 5,728,458 A | 3/1998 | Sweeney | 428/312.4 |
| 5,895,025 A * | 4/1999 | Alesi et al. | 108/51.11 |

* cited by examiner

Primary Examiner—Blaine Copenheaver
Assistant Examiner—Leanna Roché
(74) Attorney, Agent, or Firm—Shlesinger Arkwright & Garvey LLP

(57) ABSTRACT

A lightweight equipment base comprises a foam core having top, bottom and side surfaces; a first layer of paint disposed on the top and side surfaces; sand particles disposed on the top and side; and a second layer of paint disposed on the top and side surfaces over the sand particles.

9 Claims, 2 Drawing Sheets

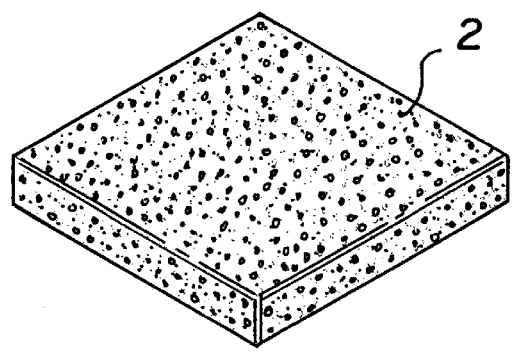
FIG_3
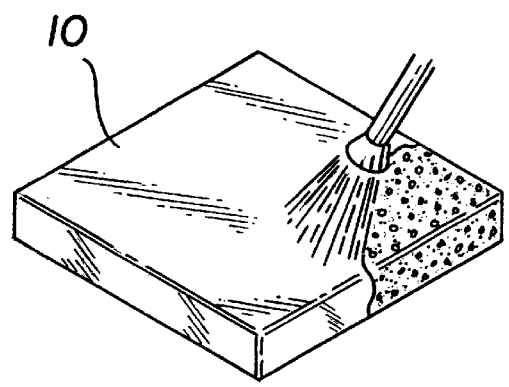
FIG_4
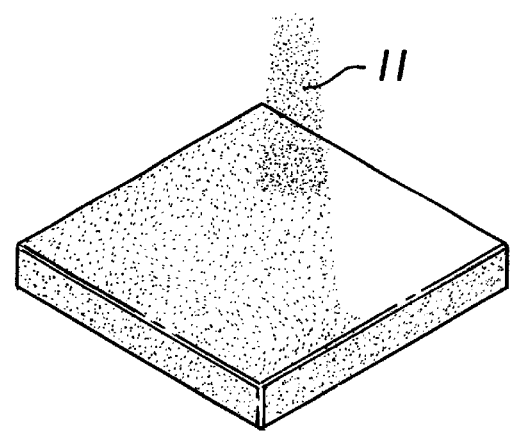
FIG_5
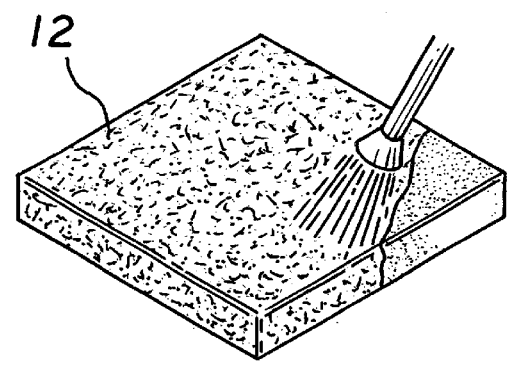
FIG_6

LIGHTWEIGHT SUPPORT BASE FOR AN EQUIPMENT

FIELD OF THE INVENTION

The present invention relates generally to a support base for outdoor equipment, such as a condenser unit of an air conditioning system, and particularly to a lightweight support base made of plastic material.

BACKGROUND OF THE INVENTION

Outdoor equipment such as the condenser unit of an air conditioning system is usually supported on pre-cast concrete slabs, which are typically very heavy and require the services of several workers to transport, handle and install. Onsite poured slabs are also used, but is time consuming due to construction of a form and mixing of concrete. These concrete slabs, either pre-cast or made onsite, can generally support more load than they are typically used for, which results in underutilization.

There is therefore a need for a lightweight support base for an outdoor equipment that can be easily transported and installed onsite and is better suited to smaller equipment, which is generally lightweight.

OBJECTS AND SUMMARY OF THE INVENTION

It is an object of the present invention to provide a support base for an outdoor equipment that is lightweight.

It is another object of the present invention to provide a support base for an outdoor equipment that is relatively inexpensive to manufacture.

It is still another object of the present invention to provide a support base for an outdoor equipment that is made from plastic foam material that has the appearance of a concrete slab.

In summary, the present invention provides a lightweight equipment base comprising a foam core having top, bottom and side surfaces; a first layer of paint disposed on the top and side surfaces; sand particles disposed on the top and side; and a second layer of paint disposed on the top and side surfaces over the sand particles.

The present invention also provides a method of making a lightweight equipment base, comprising providing a foam core having top, bottom and side surfaces; applying a first coat of paint on the top and side surfaces; before the first coat of paint dries, applying sand particles on the top and side surfaces; and applying a second coat of paint on the top and side surfaces.

These and other objects of the present invention will become apparent from the following detailed description.

BRIEF DESCRIPTIONS OF THE DRAWINGS

FIG. 3 is a perspective view of a foam block use in the present invention.

FIG. 4 is a perspective view of the foam block of FIG. 3, shown with a coat of paint being applied on its exterior surfaces.

FIG. 5 is a perspective view of the foam block of FIG. 3 after a coat of paint has been applied on its exterior surfaces, depicting the sprinkling of sand particles on the wet coat of paint.

FIG. 6 is a perspective of a foam block of FIG. 5 after the sprinkling of sand particles, depicting the application of another coat of paint on its exterior surfaces to seal and further adhere the sand particles to the foam block.

DETAILED DESCRIPTION OF THE INVENTION

Figure 1:
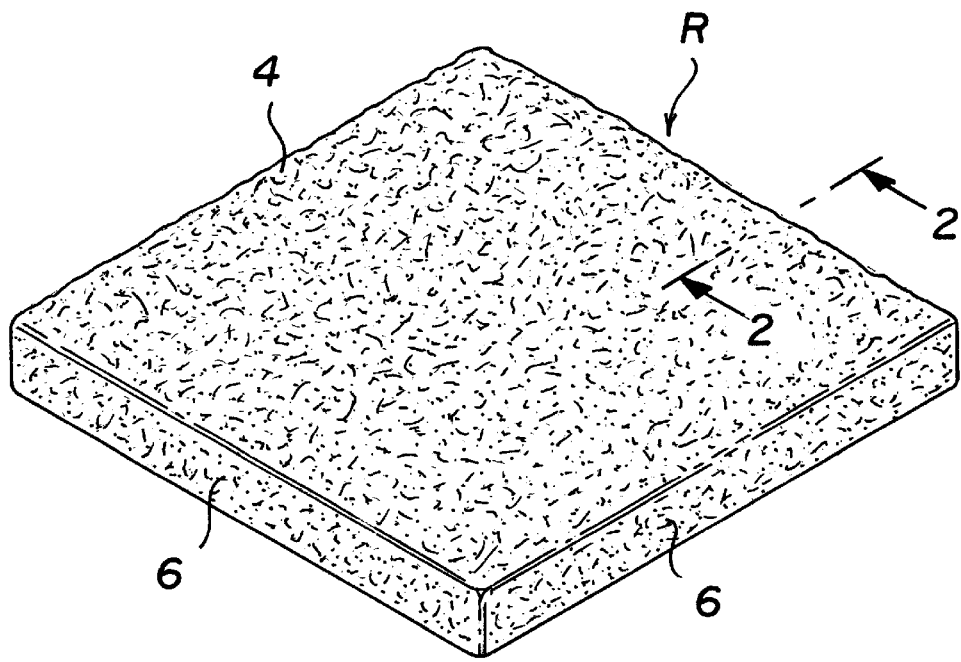
FIG. 1 is top perspective view of an equipment support base made in accordance with the present invention.
Figure 2:
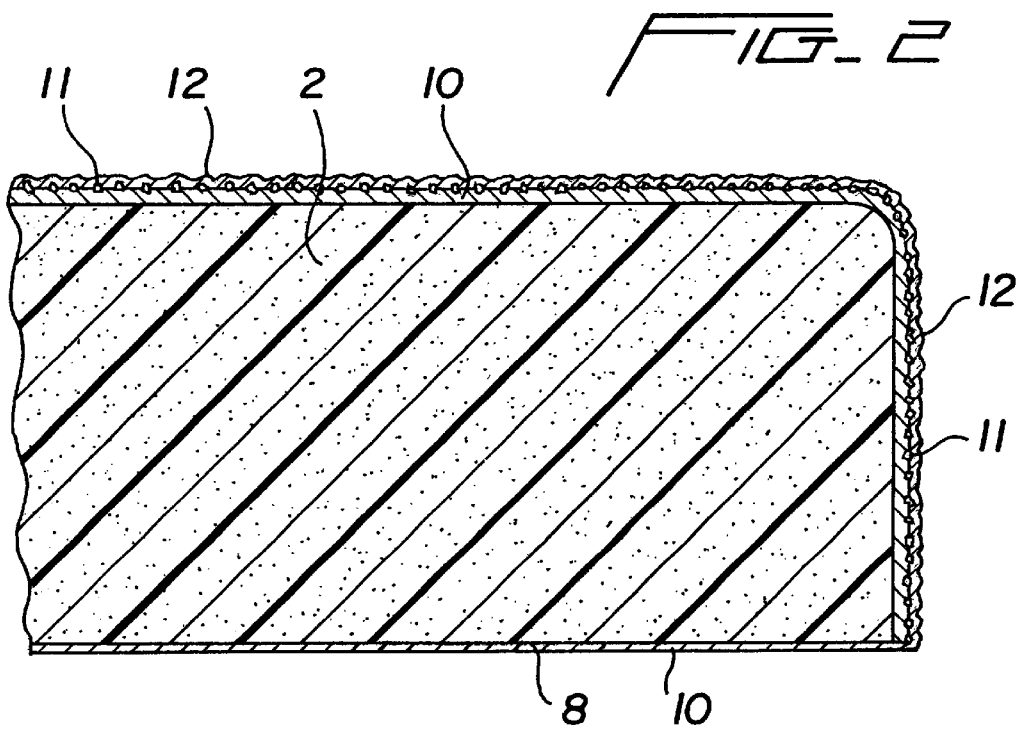
FIG. 2 is a fragmentary cross-sectional view taken along line 2—2 of FIG. 1.

A lightweight equipment base R made in accordance with the present invention is disclosed in FIG. 1. The base R comprises a foam core 2 preferably made of rigid expanded polystyrene (EPS) foam block having a top surface 4, side surfaces 6 and a bottom surface 8. The footprint of the base R is preferably square or rectangle, although other shapes may be used, depending on the specific application for the base. It is also preferable to have the top and bottom surfaces 4 and 8 to be parallel to each other for ease of manufacture and installation.

A layer of paint covers the top, bottom and side surfaces of the foam block 2. Preferably, a gray latex primer paint is used. Sand particles 11 are disposed over the top and side surfaces. A second layer of paint 12, preferably exterior enamel paint, covers the top and side surfaces to seal the sand particles 11 and further help adhere the sand particles to the foam block 2.

The foam block 2 advantageously helps to absorb vibration from the equipment, promoting stabler and quieter operation. The paint layers 10 and 12 advantageously provide UV protection to the foam block 2. The sand particles 11 advantageously provide a non-skid surface to the foam block 2 to help hold the equipment in place. The paint layer 12 is preferably made of gray exterior enamel paint. The paint layers 10 and 12 advantageously provide water proofing to the foam block 2, since the base R would be used mostly in outdoor applications, supporting the outdoor units of residential air conditioning systems.

In the manufacture of the base R, the exterior surfaces of the foam block 2 are coated with a layer of gray paint primer, as best shown in FIGS. 3 and 4. Subsequently, before the paint dries up, sand particles 11 are sprinkled on the top and side surfaces of the foam block 2. After the paint layer 10 dries up, a second layer of paint 12 is applied on the top and side surfaces of the foam block 2, sealing and further securing the sand particles to the foam block 2. The sand particles are uniformly applied over the exterior surfaces. The bottom surface 8 is also coated with paint for water proofing purposes. The paint layers 10 and 12 advantageously provide UV protection for the foam block 2.

The base R will be typically used as an outdoor support base for a condenser unit of an airconditioning system. The surface on which the base R is installed should be level and non-expansive, compacted surface capable of supporting the air conditioner condenser unit mounted on the base R.

Typically, the base R has a load capacity of approximately 25 lb/sq. in. For example, a 2 ft. by 2 ft. by 2 in. thick base R would be more than adequate for supporting a 300 lb. condenser unit.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A lightweight equipment base, comprising:
   a) a foam core having top, bottom and side surfaces;
   b) a first layer of paint disposed on said top and side surfaces;
   c) sand particles disposed on said top and side surfaces; and
   d) a second layer of paint disposed on said top and side surfaces over said sand particles.

2. A lightweight equipment base as in claim 1, wherein said foam core is solid EPS.

3. A lightweight equipment base as in claim 1, wherein said first layer of paint is gray latex primer paint.

4. A lightweight equipment base as in claim 1, wherein said second layer of paint is gray latex paint.

5. A lightweight equipment base as in claim 1, wherein said bottom surface includes a coat of paint.

6. A lightweight equipment base as in claim 5, wherein said coat of paint is gray latex primer paint.

7. A lightweight equipment base as in claim 1, wherein said foam core is rectangular.

8. A method of making a lightweight equipment base, comprising:
   a) providing a foam core having top, bottom and side surfaces;
   b) applying a first coat of paint on the top and side surfaces;
   c) before the first coat of paint dries, applying sand particles on the top and side surfaces; and
   d) applying a second coat of paint on the top and side surfaces over said sand particles.

9. A method as in claim 8, and further comprising applying a coat of paint on the bottom surface.

* * * * *